(12) United States Patent  
Chen (10) Patent No.: US 8,175,425 B2  
(45) Date of Patent: May 8, 2012

(54) METHOD AND APPARATUS FOR PROVIDING AN AUTOMATED PATCH PANEL

(75) Inventor: David Z. Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 389 days.

(21) Appl. No.: 12/195,651

(22) Filed: Aug. 21, 2008

(65) Prior Publication Data

US 2010/0046885 A1    Feb. 25, 2010

(51) Int. Cl.
 *G02B 6/26* (2006.01)
 *G02B 6/42* (2006.01)
(52) U.S. Cl. .............................. 385/22; 385/16; 385/134

(58) Field of Classification Search ................... 385/16, 385/22, 52, 134–137
See application file for complete search history.

(56) References Cited

U.S. PATENT DOCUMENTS

| 5,317,659 | A  | * | 5/1994 | Lee ................................. 385/22 |
| 5,394,503 | A  | * | 2/1995 | Dietz et al. ..................... 385/135 |
| 5,581,644 | A  | * | 12/1996 | Saito et al. ...................... 385/17 |
| 5,613,021 | A  | * | 3/1997 | Saito et al. ...................... 385/17 |
| 6,243,510 | B1 | * | 6/2001 | Rauch ............................. 385/15 |
| 6,307,983 | B1 | * | 10/2001 | Goossen ......................... 385/16 |
| 7,555,189 | B2 | * | 6/2009 | Chen ............................. 385/134 |

* cited by examiner

*Primary Examiner* — Daniel Petkovsek (57) ABSTRACT

An approach is provided for an automated patch panel. A command is received to change a connection state of an optic patch cord. A robotic arm is controlled to change the connection state of the optic patch cord with respect to a particular port of a plurality of ports disposed about a disk-shaped face of a docking panel.

9 Claims, 12 Drawing Sheets

METHOD AND APPARATUS FOR PROVIDING AN AUTOMATED PATCH PANEL

BACKGROUND INFORMATION

With an increase in demand for broadband communications and services, telecommunication service providers are migrating towards long-distance, large-capacity optical communication networks. These fiber optic transmission systems typically utilize patch panels to provide termination and cross-connection between various fiber optic links, such as between main trunk lines and subscriber lines. In this manner, conventional patch panels generally have two corresponding arrays or matrices for receiving and terminating two sets of fiber optic lines, i.e., an incoming set (e.g., main trunk lines) and an outgoing set (e.g., subscriber lines). It is common for the incoming and outgoing fibers to be terminated at fixed positions on corresponding termination panels. Fiber optic patch cords are then provisioned between these fixed positions to provide for photonic switching, i.e., optical-to-optical signal transmission between incoming and outgoing fibers. Compared to conventional copper wiring, fiber optic cables require a higher level of precision in terms of care to ensure proper connections. Traditionally, provisioning patch cords is an expensive, time-consuming process that must be manually performed by at least one highly trained technician. Moreover, the tracking and recording of these connections have been manually intensive.

Therefore, there is a need for automated, cost-effective patch panels for manipulating and tracking patch cord connections.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing automated patch panels are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to optical fiber transmission lines within telecommunications infrastructures, it is contemplated that various exemplary embodiments are also applicable to other equivalent transmission lines and/or working environments.

Figure 1:
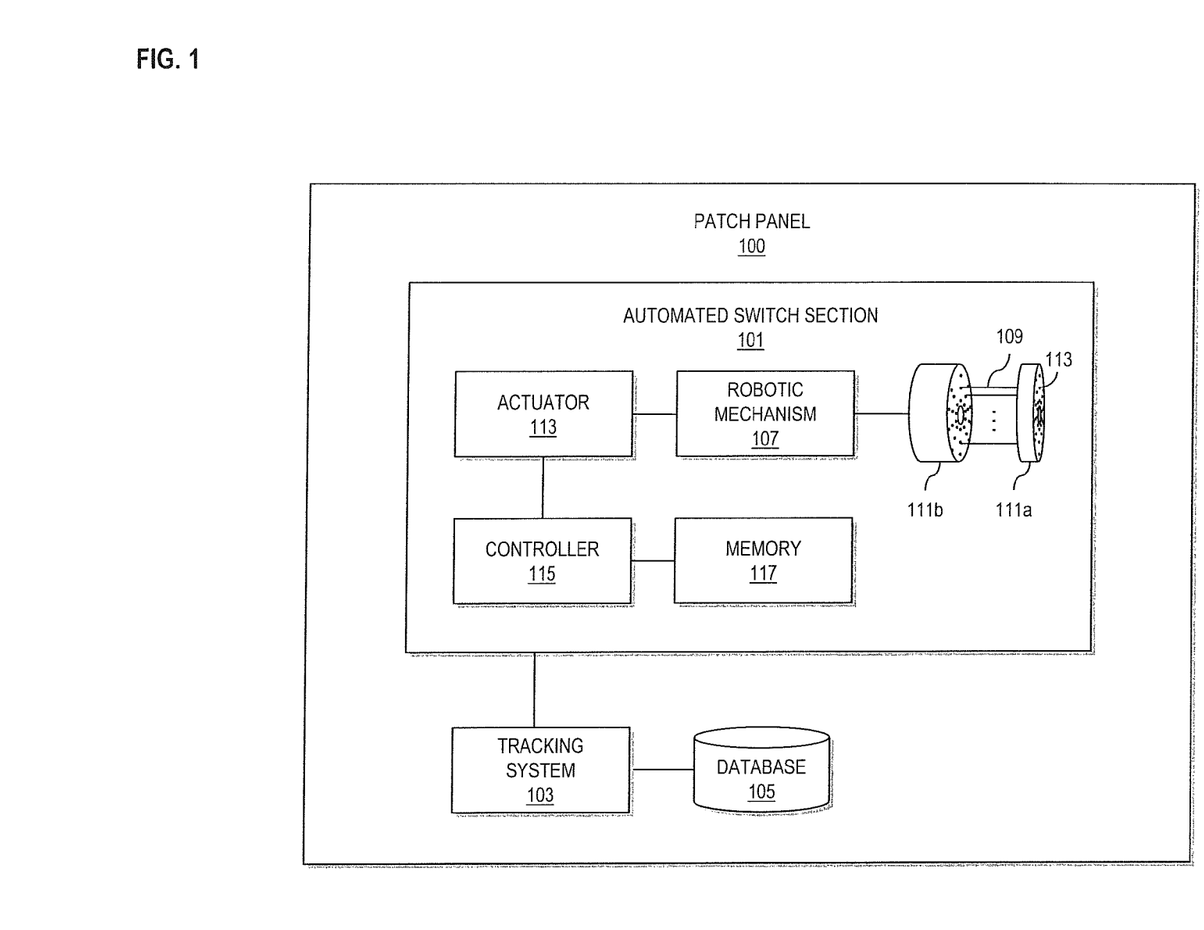
FIG. 1 is a block diagram of an automated patch panel, according to an exemplary embodiment.

FIG. 1 is a block diagram of an automated patch panel, according to an exemplary embodiment. In this example, patch panel 100 is an optical fiber patch panel including automated switch section 101 and tracking system 103 coupled to database 105. Automated switch section 101 utilizes one or more robotic mechanisms (e.g., robotic arms with end effectors) 107 for the engagement (or disengagement) of one or more optical fibers (or patch cords) 109 between corresponding termination panels 111a and 111b. Patch panel 100 may be utilized within a telecommunications infrastructure, such as for connecting incoming and outing transmission lines of a transport network or other type of communication system. Thus, transmission paths can be arranged and rearranged by robotic mechanism(s) 107 by creating or breaking one or more patch cord connections. While specific reference will be made thereto, it is contemplated that patch panel 100 may embody many forms and include multiple and/or alternative components.

It is recognized that the deployment of effective cable management techniques enable large scale transport networks, such as fiber optic transport networks, to be more flexible, more susceptible to fluid changes, and more accessible for configuration, maintenance, and testing procedures, as well as more prepared for future infrastructure growth and expansion. Within fiber optic systems, telecommunication service providers typically utilize three basic approaches to network architectures, i.e., direct connections, interconnections, and cross-connections. Direct connections enable direct information exchange between the output of one network node to the input of another. While the least costly of the three methods, direct connections are rather inflexible and require manually configuring fiber optic transmission lines at potentially far-flung source and destination points. Accordingly, telecommunication service providers typically opt for interconnection or cross-connection architectures.

Interconnection architectures utilize patch panels to act as intermediary points for several fiber optic transmission lines, which may originate (or terminate) at one or more source or destination points. Transmission paths are established by connecting a source transmission line to a destination transmission line at corresponding input/output sites of input/output panel(s) of the interconnection patch panel. While lessening the burden to travel to remote source and destination points, conventional interconnection patch panels must still be manually configured, and typically lack circuit access for remote monitoring, testing, and patching. Centralized cross-connection architectures enable fiber optic transmission lines to be permanently connected to termination panels of a patch panel assembly. Transmission paths are established via fiber optic patch cords that create semi-permanent connections between these termination panels. While cross-connections enable new network nodes to be more easily added to an infrastructure, allow network failures to be more easily routed around, and provide more easy isolation, maintenance, testing, and patching, conventional cross-connections must also be manually configured.

Furthermore, as the amount and density of fiber optic transmission lines within conventional interconnection and cross-connection patch panels increase, it becomes harder to access and identify particular fibers for reconfiguration, service, and/or repair work. Often times, technicians must disconnect several transmission lines in order to access the particular fiber(s) requiring attention. This introduces the additional possibility that otherwise properly working fibers will become inadvertently damaged or dislodged, not to mention that manual processes are prone to human error. Moreover, given the fact that active fibers can potentially cause eye damage if viewed straight on, technicians are also at least subject to possible health hazards. All in all, manually configuring and tracking patch panels is a time-consuming, burdensome, expensive, and potentially dangerous process.

Therefore, the approach employed by optical patch panel 100, according to certain embodiments, stems from the recognition that by automating the engagement and disengagement of optical patch cords 109 of optical patch panel 100 via one or more robotic mechanisms 107 enables telecommunication service providers to increase patch panel reliability, lower provisioning and maintenance costs, reduce human error, and expedite failure recovery (e.g., rerouting) procedures. Furthermore, by providing automated patch cord tracking and remote access to the control functions and automated processes of patch panel 100, telecommunication service providers can significantly reduce their operating costs and service downtime as technicians can quickly and accurately perform their work via a networked application.

As seen in FIG. 1, robotic mechanisms 107 are operated via one or more actuators (e.g., motors) 113 that are controlled by one or more controllers (or processors) 115. Actuators 113 manipulate the mechanical components of robotic mechanisms 107. According to one embodiment, actuators 113 may include belt drives, comb drives, electroactive polymers, hydraulic mechanisms, motors, pistons, piezoelectric mechanisms, pneumatic mechanisms, relays, step motors, thermal bimorphs, etc. For instance, actuators 113 cause the displacement, extension, retraction, and/or rotation of robotic mechanisms 107 based on information provided by controller 115. That is, controller 115 controls the operation of actuators 113 and, thereby, robotic mechanisms 107 according to programs and/or data stored to memory 117. Memory 117 may represent a hierarchy of memory, which may include both random access memory (RAM) and read-only memory (ROM). Computer instructions, such as control logic, path planning, and move sequence instructions, as well as corresponding data for manipulating robotic mechanisms 107, can be stored in non-volatile memory, such as erasable programmable read-only memory (EPROM), electrically erasable programmable read-only memory (EEPROM), and/or flash memory. Memory 117 may be implemented as one or more discrete devices, stacked devices, or integrated with controller 115 or database 105.

In this manner, control functions may be implemented in a single controller or via multiple controllers. Suitable controllers 115 may include, for example, both general purpose and special purpose controllers or digital signal processors. According to exemplary embodiments, controller 115 is configured to receive control and configuration information over one or more communication networks (not shown) for controlling robotic mechanisms 107 and, thereby, may include or interface with a communication interface (not illustrated). Suitable communication networks may include local area networks (LAN), metropolitan area networks (MAN), wide area networks (WAN), the Internet, etc. Automated switch section 101, including robotic mechanisms 107, is more fully described in association with FIGS. 2-7.

It is also noted that patch panel 100 includes tracking system 103 coupled to database 105 for monitoring patch cord connections. While illustrated as part of patch panel 100, it is contemplated that tracking system 103 and/or database 105 may interface with patch panel 100 over one or more of the aforementioned communication networks, such as may be the case when a centralized network management system is utilized to monitor the patch panel connections of patch panel 100. The physical positions of the patch cords are referred to as connection states (or connection positions); accordingly, a change in one position with respect to one optical connection is considered a change of connection state. In this manner, tracking system 103 can monitor patch panel connections formed by patch cords 109 and can record corresponding connection mapping information to database 105. Monitoring procedures may, in exemplary embodiments, be achieved through out-of-band communications. That is, tracking system 103 can transmit out-of-band communications on respective patch cords 109, such that if a signal can be successfully transmitted between termination panels 111a and 111b, i.e., between respective termination points (or ports) 113 on termination panels 111a and 111b, it will indicate the existence of a connection. Based on the success or failure of these transmissions, tracking system 103 can generate connection mapping information, i.e., patch cord connections and corresponding termination points. The connection mapping information can be stored to database 105 or any other suitable memory, such as memory 117. In other instances, tracking system 103 may alternatively (or additionally) monitor and record connection (or patching) events, i.e., events corresponding to robotic mechanisms 107 engaging or disengaging one or more of patch cords 109. Other suitable information may also be monitored by tracking system 103 and, thereby, stored to database 105. For instance, tracking system 103 may monitor and compile information corresponding to routing information (e.g., traffic source and destination points, network traffic path, etc.), network traffic information (e.g., reserved bandwidth, consumed bandwidth, class of service, etc.), patch cord configuration or performance information (e.g., attenuation, frequency, insertion loss, numerical aperture, single/multimode, spectral range, etc.), and the like.

Figure 2A:
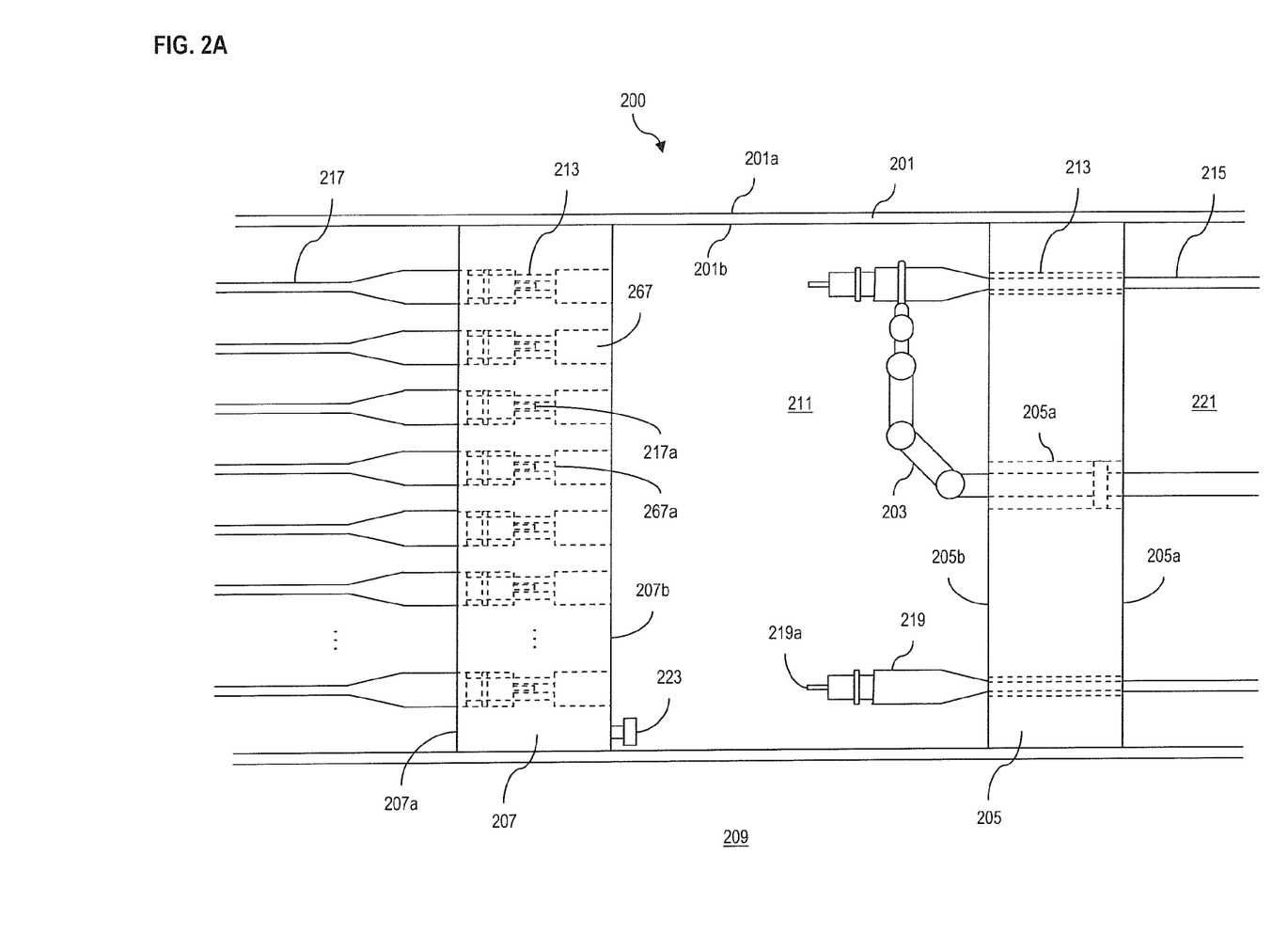
FIGS. 2A and 2B are schematic diagrams of automated patch panels incorporating robotic arms, according to exemplary embodiments.
Figure 2B:
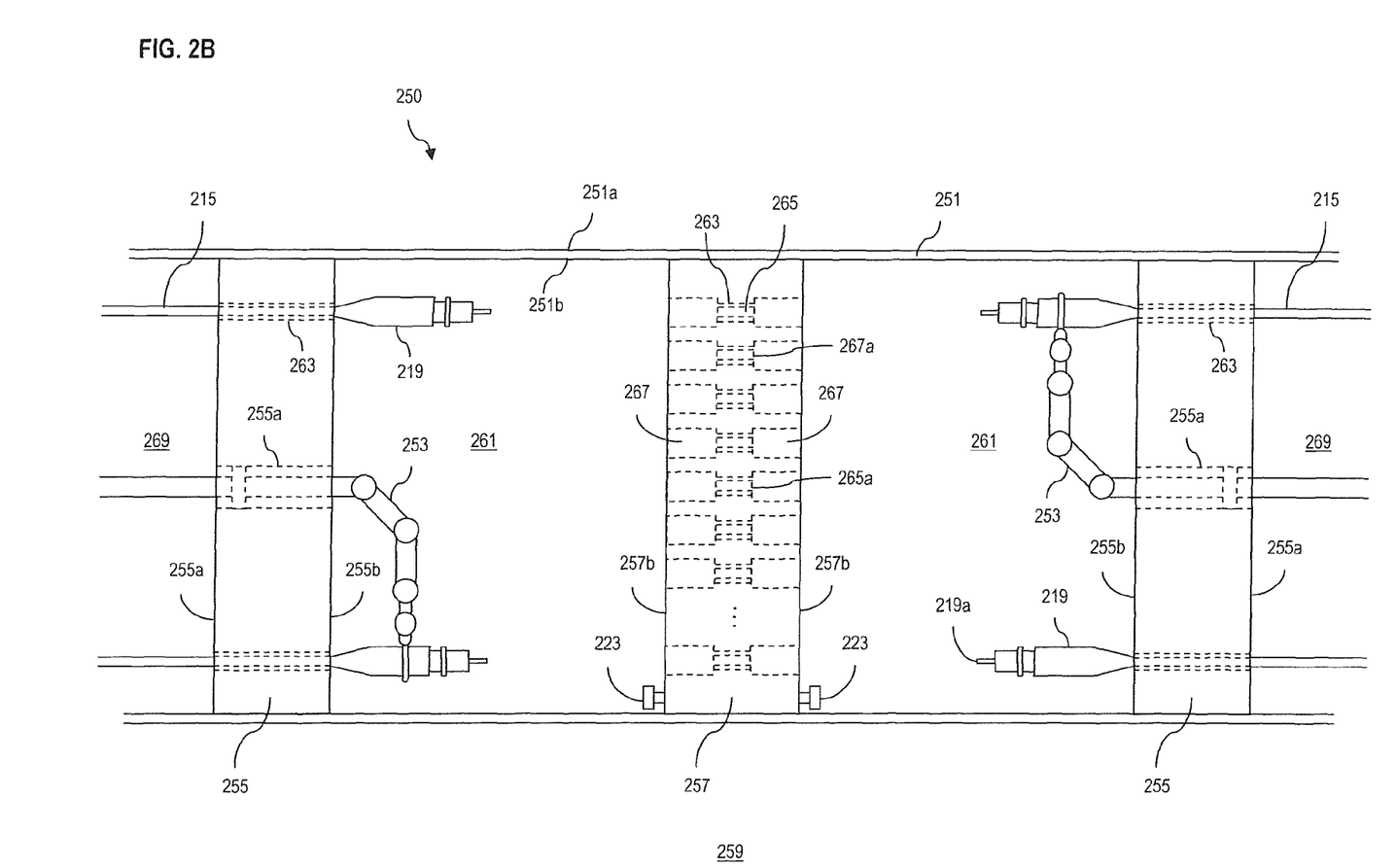

FIGS. 2A and 2B are schematic diagrams of automated patch panels incorporating robotic arms, according to exemplary embodiments. In these examples, automated patch panel 200 is an exemplary patch panel for establishing automated interconnections and automated patch panel 250 is an exemplary patch panel for establishing automated cross-connections. Patch panels 200 and 250 respectively include enclosures 201 and 251; robotic arm(s) 203 and 253; and termination panels 205, 207, 255 and 257. It is contemplated that automated patch panels 200 and 250 may embody many other forms.

According to one embodiment, enclosures 201 and 251, as well as termination panels 205, 207, 255, and 257 are cylindrically shaped. It is contemplated, however, that any other suitable geometry, such as a triangular geometry, rectangular geometry, hexagonal geometry, etc., may be utilized. As shown, however, enclosures 201 and 251 are sleeve-like, having an outer facades 201a and 251a, and inner facades 201b and 251b. Outer facades 201a and 251a are exposed to environment 209 and 259, while inner facades 201b and 251b are exposed to inner cavity regions 211 and 261. Meanwhile, termination panels 205, 207, 255, and 257 are cylinders; however, as with enclosures 201 and 251 other suitable geometries are contemplated, such as triangular prisms, rectangular prisms, hexagonal prisms, etc. Panels 205, 207, and 255 have respective outer facades 205a, 207a, and 255a and respective inner facades 205b, 207b, and 255b. Inner facades 205b, 207b, and 255b are exposed to inner cavities 211 or 261, while outer facades 205a, 207a, and 255a are not exposed to inner cavities 211 or 261. As such, panel 257 can be considered to have corresponding inner facades 257b. As will become more apparent below (e.g., with respect to FIGS. 5A and 5B), termination panels 205, 207, 255, and 257 include multiple bores (or ports) 213 and 263 radially arrayed about the inner and outer facades 205a, 205b, 207a, 207b, 255a, 255b, and 257b of termination panels 205, 207, 255, and 257. From this point forward, termination panels 205 and 255 will be hereinafter referred to as patch cord panels 205 and 255, while termination panels 207 and 257 will be hereinafter referred to as docking panels 207 and 257.

According to one embodiment, enclosures 201 and 251 are substantially sealed off from surrounding environments 209 and 259, such as hermetically sealed off, so as to prevent contaminants, e.g., dirt, grime, etc., from entering inner cavity regions 211 and 261 that may otherwise corrode or affect the quality of connections between optical fibers, such as between optical fibers 215 of patch cord panels 205 and 255 and optical fibers 217 or 265 of docking panels 207 or 257. It is noted that optical fibers 215 and 217 may be terminal ends of long haul fibers or may lead to equipment within a same general region (e.g., same room, central office, etc.) where automated patch panels 200 and 250 are located. According to certain embodiments, optical fibers 265 may extend in an intermediary section of bores 263 between connector receiver bores 267 of docking panel 257. It is noted, however, that connector receiver bores 267 may be configured so that corresponding distal fiber optic tips 219a of corresponding patch cord connectors 219 may abut one another within bores 263 of docking panel 257. As such, patch cord connections may be directly established between respective ends 219a of patch cord connectors 219. Connector receiver bores 267 may be provided in docking panel 207. In certain embodiments, distal fiber optic tips 217a and 265a of optical fibers 217 and 265 can be countersunk from, flush with, or extended from an innermost surface 267a of connector receiver bores 267. Furthermore, it is noted that optical fibers 217 may be permanently or semi-permanently connected, spliced, or otherwise coupled or mated to docking panel 207. As shown, optical fibers 217 are mated to docking panel 207 via connectors, such as connectors similar to patch cord connectors 219; however, any conventional optical fiber connector may be utilized, such as one or more of the conventional optical fiber connectors listed below in the description of FIGS. 6A and 6B.

Patch cord panels 205 and 255 respectively include central bores 205a and 255a for receiving robotic arms 203 and 253. That is, robotic arm 203 extends through central bore 205a from outer cavity 221 to inner cavity 211. Robotic arms 253 extend through central bores 255a from outer cavities 269 to inner cavities 261. According to one embodiment, robotic arms 203 and 253 are supported by (e.g., cantilevered from) central bores 205a or 255a. In other instances, robotic arms 203 and 253 can be supported via one or more regions of facades 201a, 251a, 205a, 205b, 207a, 207b, 255a, 255b, or 257b, or from another, not illustrated, component of automated patch panels 200 and 250. It is also noted that docking panels 207 and 257 may include one or more cleaning pads 223 for cleaning and/or polishing the distal fiber optic tips (e.g., tips 219a) of patch cord connectors 219. An exemplary cleaning pad is more fully described in association with FIG. 7. An exemplary patch cord is explained with more detail in connection with FIG. 6.

Figure 3:
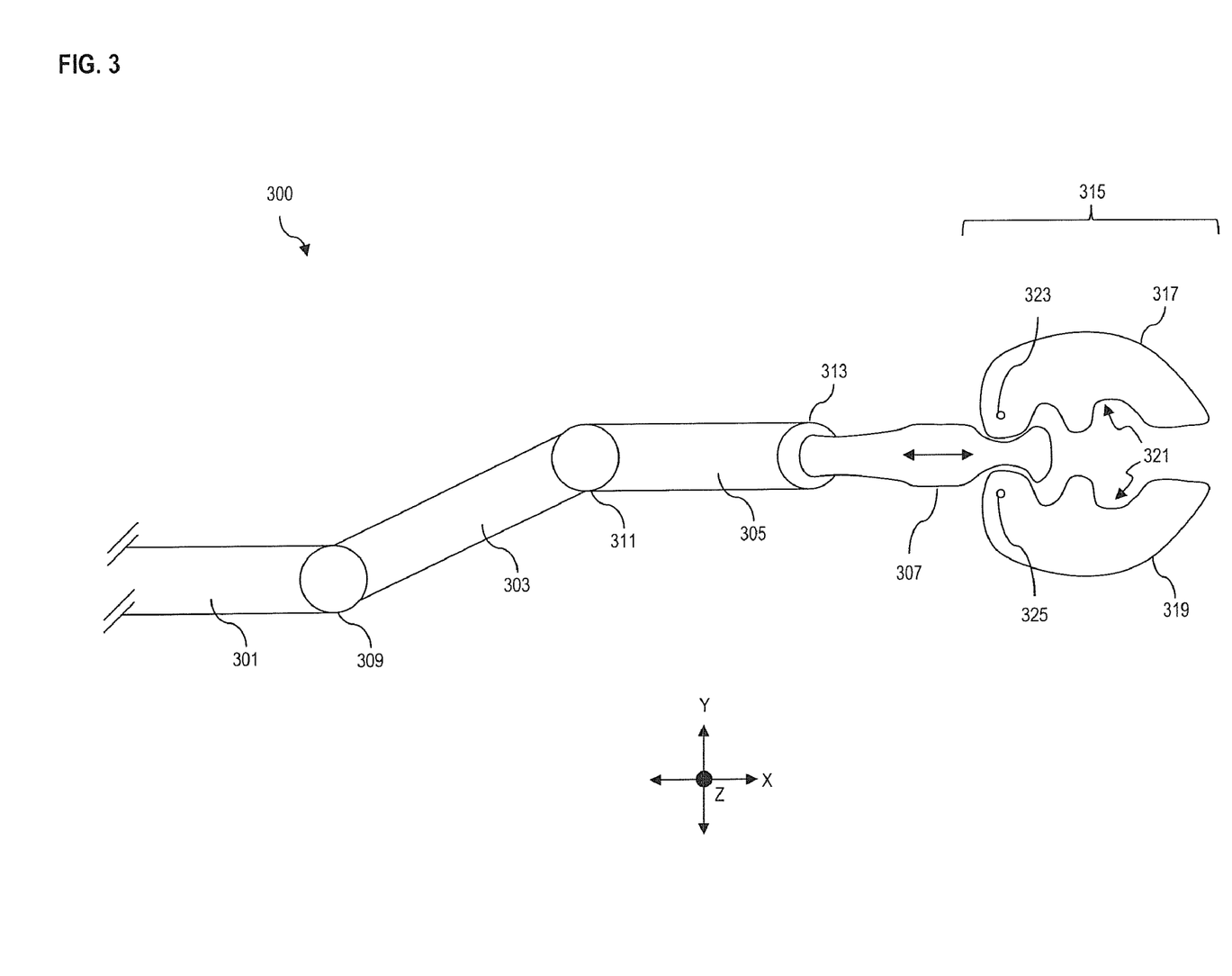
FIG. 3 is a schematic diagram of a robotic arm, according to an exemplary embodiment.
Figure 4A:
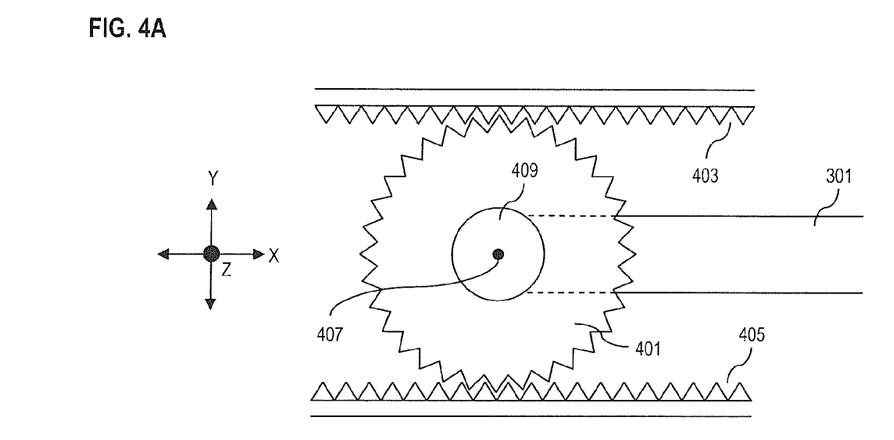
FIGS. 4A-4C are schematic diagrams of supports for a robotic arm, according to exemplary embodiments.
Figure 4B:
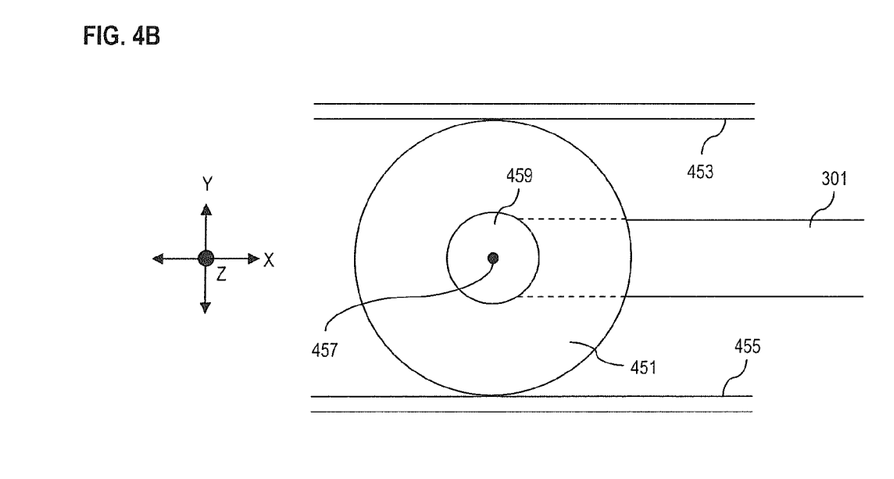
Figure 4C:
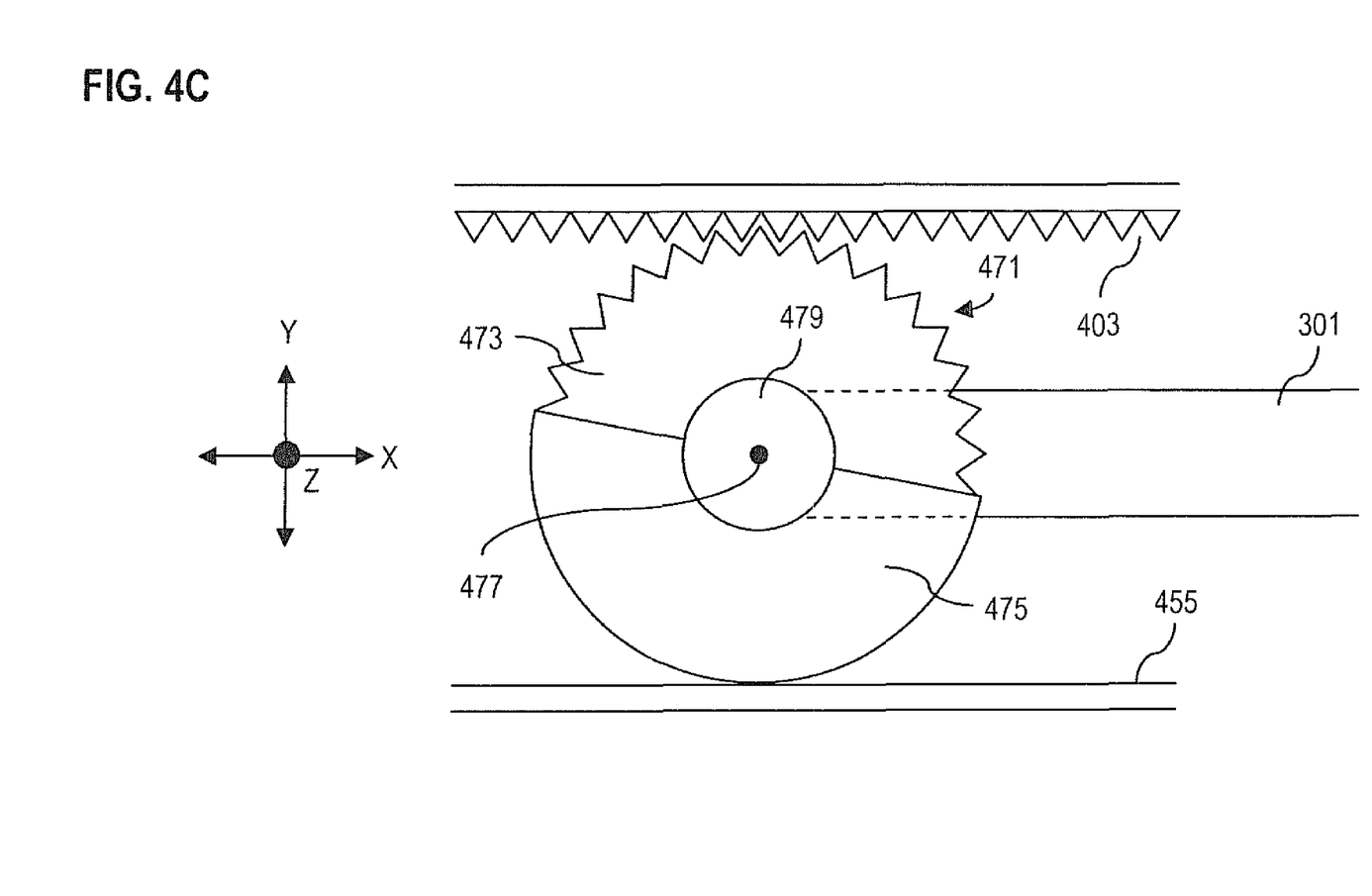

Referring now to FIGS. 3 and 4, a more detailed description of exemplary robotic arms 203 and 253 is provided.

FIG. 3 is a schematic diagram of a robotic arm, according to an exemplary embodiment. Robotic arm 300 includes one or more links (e.g., links 301, 303, 305, and 307) connected by one or more joints (e.g., joints 309, 311, and 313). In this manner, robotic arm 300 may be articulated and, thereby, enable three-dimensional motion for selecting and engaging (or disengaging) optical patch cord connectors 219. More particularly, robotic arm 300 is capable of translational displacement in each of the imaginary X, Y, and Z-directions, as well as combinations thereof. Further, robotic arm 300 is capable of rotational motion within the imaginary XY, XZ, and YZ-planes. According to one embodiment, rotational motion within the XY, XZ, and YZ-planes can occur at one or more of joints 309, 311 and 313. According to particular embodiments, the various links 301-307 of robotic arm 300 may be telescopic, i.e., capable of translational extension and retraction. Alternatively, robotic arm 300 may also be unarticulated. Accordingly, robotic arm 300 may embody any suitable robotic manipulator, such as a Cartesian manipulator, a gantry manipulator, a cylindrical manipulator, a spherical (or polar) manipulator, a selective compliance assembly manipulator, a parallel manipulator, etc., as well as combinations thereof.

Robotic arm 300 also includes an end effector 315, such as a claw, finger, hand, hook, tong, grapple, or other grasping assembly or suitable robotic manipulator. As shown, end effector 315 is a claw-like assembly including two claws, i.e., claw 317 and 319, with corresponding arcuately contoured regions 321 configured to relate to and securely grasp optical patch cord connectors 219. Claws 317 and 319 are capable of rotational motion in the XY-plane, i.e., respective rotation about axes 323 and 325. In this manner, claws 317 and 319 may be pinned (or otherwise suitably secured or joined) to link 307 through axes 323 and 325. According to various embodiments, linear retraction or expansion (i.e., retraction or expansion in the imaginary "X" direction) of link 307 or within link 307, such as a tensioning member (e.g., a spring), causes claws 317 and 319 to rotate about axes 323 and 325. Such rotation enables robotic arm 300 to grasp onto or release an optical patch cord connector 219.

According to exemplary embodiments, link 301 is coupled to one or more actuators (not shown), such as actuator 113, for manipulating the various components (e.g., links 301-307, joints 309-313, and end-effector 315) of robotic arm 300. In this manner, link 301 is also supported in (e.g., cantilevered from) a central bore of a patch cord panel (not illustrated), e.g., such as central bore 205a or 255a of patch panel 205 or 255. It is noted, however, that robotic arm 300 may be alternatively cantilevered from (or otherwise supported via) a facade of termination panels 205, 207, 255, or 257, enclosure 201 or 251, or another component of automated patch panel 200 or 250. It is further noted that one or more actuators 113 may be provided as part of or otherwise coupled to links 301, 303, 305, and 307 and/or joints 309, 311, and 313. Exemplary supports are more fully described in conjunction with FIGS. 4A and 4B.

In order to prevent collision (or entanglement) of robotic arm 300 with optical patch cords, enclosure 201 or 251, and/or termination panels 205, 207, 255, and 257, robotic arm 300 may include one or more proximity and/or motion sensors (not shown). The motion sensors may comprise an accelerometer, gyroscopic positioning sensor, or vibration sensing device for detecting motion of robotic arm 300. Output from the motion sensors may be utilized by controller 115 for resolving a position of robotic arm 300. Proximity sensors detect the presence of "nearby" objects via, for example, distortions in generated electromagnetic or electrostatic fields, electromagnetic radiation (e.g., infrared, radio frequency, intermediate frequency, etc.) beams, photoelectric beams, sound (e.g., ultrasonic) propagations, etc. Controller 115 may be provided with sensed information from the proximity sensors to halt and/or redirect the course of robotic arm 300.

FIGS. 4A-4C are schematic diagrams of supports for a robotic arm, according to exemplary embodiments. As shown, link 301 of robotic arm 300 is coupled to a linear rack support gear 401 or a linear support wheel 451. Linear rack support gear 401 biases against and, thereby, engages with linear gear racks 403 and 405. Similarly, linear support wheel 451 biases against surfaces 453 and 455. It is noted that linear gear racks 403 and 405, as well as surfaces 453 and 455 can be configured within a central bore of a patch cord panel, such as central bore 205a or 255a of patch cord panel 205 or 255. According to one embodiment, linear rack support gear 401 and linear support wheel are rotated about rotational axes 407 and 457 by actuators 113, such as a step motor. The step motor can be configured to linearly displace one or more of linear gear racks 403 and 405 or surfaces 453 and 455. In this manner, as linear rack support gear 401 or linear support wheel 451 rotates about rotational axes 407 and 457, the rotational motion of components 401 and 451 is translated into linear displacement of link 301 in an imaginary "X" direction. According to particular embodiments, linear rack support gear 401 and linear support wheel 451 respectively include independent rotational members 409 and 459. As such, rotational motion of rotational members 409 and 459 about rotational axes 407 and 457 can be translated into rotational motion of link 301 in an imaginary XY-plane.

It is also noted that, according to certain embodiments, such as shown in FIG. 4C, a rotational support member 471 for link 301 may be partly configured having a linear rack gear portion 473 and partly configured having a support wheel portion 475. In these instances, rotational support member 471 can bias against at least one linear gear rack (e.g., linear gear rack 403) and at least one surface (e.g., surface 455). Such a configuration can be utilized to limit the linear displacement of rotational support member 471, as linear rack gear portion 473 of rotational support member 471 can be prevented from rotating on biasing surface 455. According to one embodiment, rotational support member 471 is rotated about rotational axis 477 by actuators 113, such as a step motor. In this instance, the step motor can be configured to rotate rotational support member 471; however, the step motor may additionally (or alternatively) drive linear gear rack 403 and/or surface 455. Furthermore, rotational support member 471 can include an independent rotational member 479 similar to that of rotational members 409 and 459.

Figure 5A:
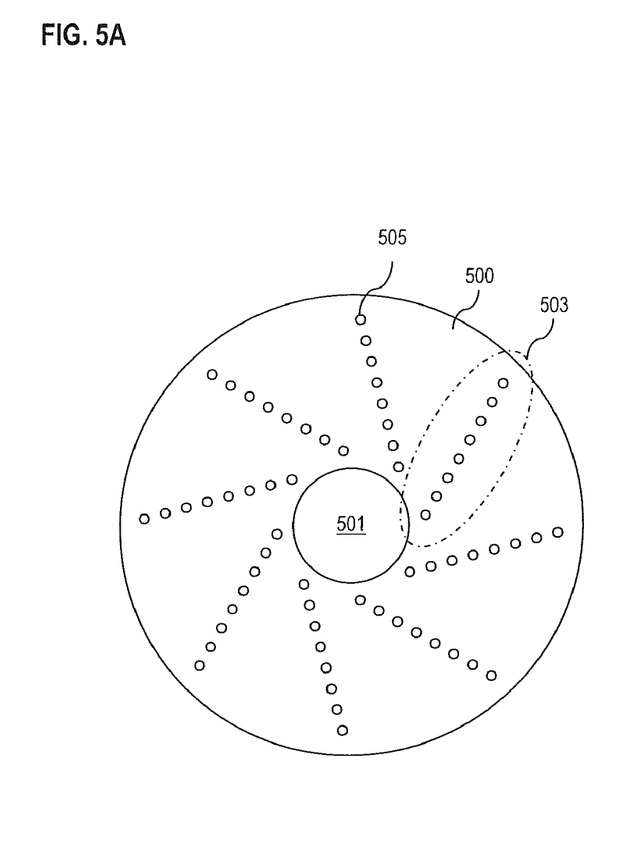
FIGS. 5A and 5B are schematic diagrams of termination panels, according to exemplary embodiments.
Figure 5B:
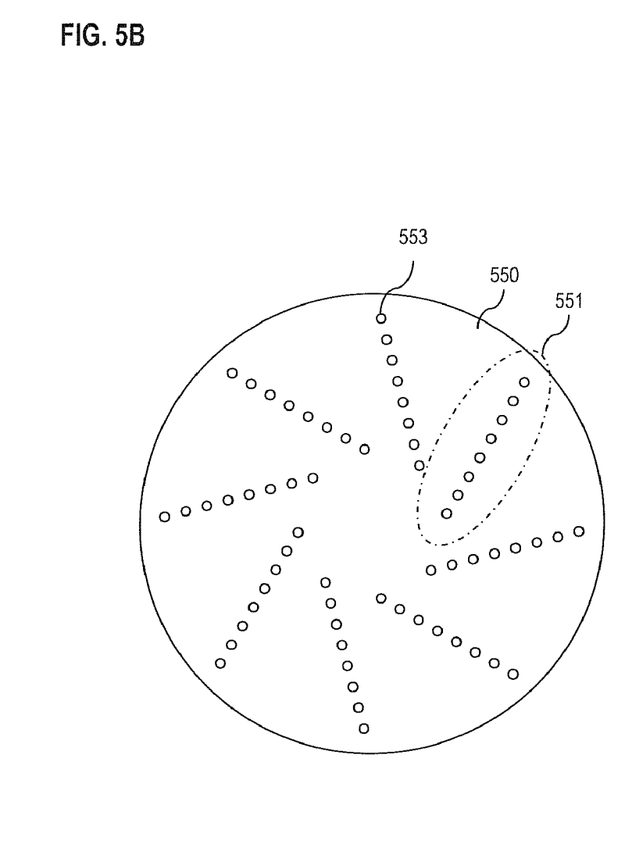

FIGS. 5A and 5B are schematic diagrams of termination panels, according to exemplary embodiments. In this example, termination panel 500 corresponds to a patch cord panel (e.g., patch cord panel 205 or 255), and termination panel 550 relates to a docking panel (e.g., docking panel 207 or 257). Termination panel 500 includes central bore 501 and one or more radial arrays (e.g., radial array 503) of one or more patch cord bores (e.g., patch cord bore 505). In a like fashion, termination panel 550 includes one or more radial arrays (e.g., radial array 551) of one or more connector receiver bores (e.g., connector receiver bore 553). While radial arrays 503 and 551 are shown aligned to portions of radially-arranged secant lines of termination panels 500 and 550, it is contemplated that radial arrays 503 and 551 may be additionally (or alternatively) aligned to radii (or portions thereof) of termination panels 500 and 550. By utilizing radial arrays 503 and 551, automated patch panel 100 can reduce the potential for inadvertent collision or entanglement of a robotic arm (e.g., robotic arm 203 or 253) with provisioned optical patch cords, as the arrangement spaces respective bores 505 and 553 more efficiently and effectively. Accordingly, termination panels 500 and 550 are shown having a cylindrical configuration and, thereby, have a width extending into the page. It is contemplated that other termination panel configurations can be implemented, such as different termination panel geometries or different array or matrix arrangements of patch cord bores 505 and connector receiver bores 553.

According to various embodiments, a robotic arm (not shown), such as robotic arm 203 or 253, can extend through and can be supported by central bore 501 of termination panel 500. In a similar fashion, the various optical patch cords of patch panel 100 can extend through, and can be supported by, corresponding patch cord bores (e.g., patch cord bore 505). The various connector receiver bores (e.g., connector receiver bore 553) of termination panel 550 are provided for mating with optical patch cords connectors 219. That is, connector receiver bores 553 act as respective conduits for connecting optical fibers and/or patch cords to termination panel 550. It is noted that connector receiver bores 553 may include connector receivers (e.g., connector receiver 267) on one or both ends of termination panel 550. In this manner, optical fiber sections (not shown) may extend in an intermediary section of bores 553 between connector receiver portions, such as is shown in FIG. 2B. While illustrated with eight respective bores 505 and 553, radial arrays 503 and 551 may include any number of respective bores 505 and 553. Moreover, although termination panels 500 and 550 are shown including eight respective radial arrays 503 and 551 of respective bores 505 and 553, any number of radial arrays 503 and 551 may be provided.

Figure 6A:
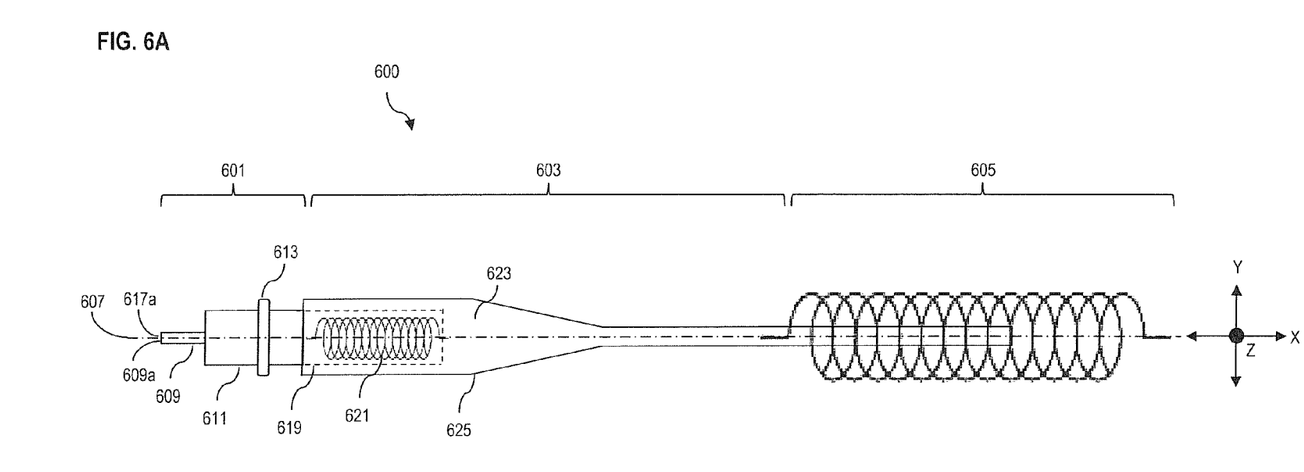
FIGS. 6A and 6B are schematic diagrams of respective views of a patch cord, according to an exemplary embodiment.
Figure 6B:
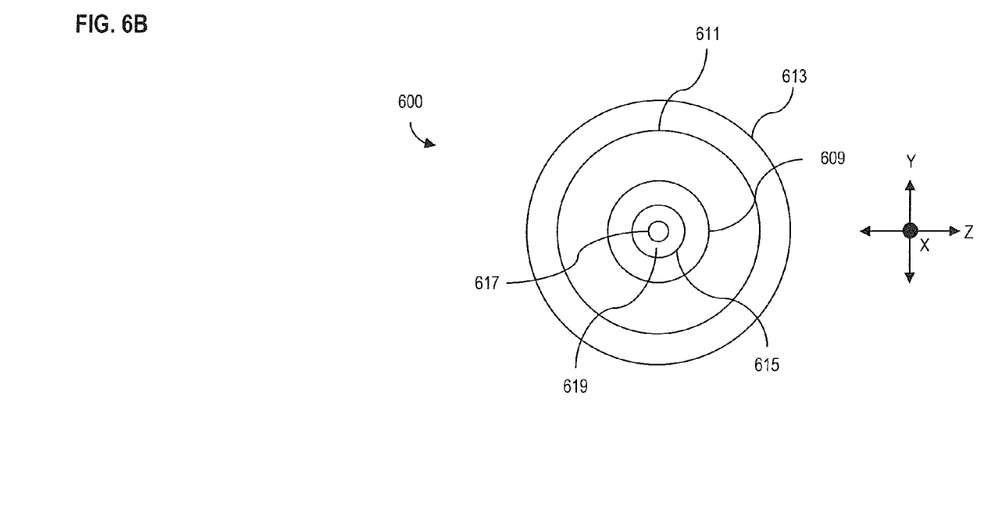

FIGS. 6A and 6B are schematic diagrams of respective views of a patch cord, according to an exemplary embodiment. In this example, patch cord 600 generally includes three main portions, i.e., connector portion 601, housing portion 603, and retraction portion 605, that are concentrically aligned to central axis 607. In this manner, connector portion 601 extends from housing portion 603 in an imaginary "X" direction and includes optical fiber ferrule 609 supported by flange unit 611 having shoulder 613. Ferrule 609 is a sleeve member with a fine pore opening 615 for exposing a distal end 617a of optical fiber core 617. Optical fiber core 617 extends axially through patch cord 600 along central axis 607 and is secured (or otherwise suspended) within ferrule 609 through, for example, a thermosetting polymer 619, such as an epoxy resin, or other suitable boding agent. It is noted that optical fiber core 617 is, in exemplary embodiments, a telecommunications transmission quality fiber; however, optical fiber core 617 may be tailored to its operating environment and, thereby, may be any suitable waveguide medium for carrying light signals, such as a glass (e.g., silica, fluorozirconate, fluoroaluminate, chalcogenide, etc.), plastic (e.g., acrylic, perfluorinated polymers, etc.), or a combination thereof, medium. In exemplary embodiments, distal end 617a of optical fiber core 617 coincides with distal end 609a of ferrule 609. More specifically, distal end 609a of ferrule 609 may be convexly shaped (i.e., bulging outwards from ferrule 609 with an axis of curvature coinciding with central axis 607). As such, distal end 617a of optical fiber core 617 may be concentrically aligned with centerline 607 and may terminate at the apex of the convex of distal end 609a. Other configurations, however, are contemplated.

Shoulder 613 of flange unit 611 serves as an alignment and centering guide for inserting connector portion 601 into a corresponding connector receiver bore, e.g., connector receiver bores 267 of docking panels 207 and 257. According to certain embodiments, shoulder 613 can also provide a sufficient radial stabilizing force, as well as a sufficient axial frictional force to hold connector portion 601 in a corresponding connector receiver bore. It is noted, however, that the combination of the stabilizing force and the frictional force can be overcome by either the engagement force (i.e., pushing force) or disengagement force (i.e., pulling force) of robotic arms 203 or 253.

Flange unit 611 is supported by housing portion 603 via flange support 619. In certain embodiments, flange support 619 includes internal biasing member (e.g., spring) 621 to provide a biasing force for ferrule 609 in the imaginary "X" direction. This biasing force aids to keep distal end 617a of optical fiber core 617 adequately contacted with a corresponding fiber optic distal end 265a or 217a of optic fibers 265 and 217.

As previously mentioned, optical fiber core 617 is centrally positioned about central axis 607. In this manner, housing portion 603 surrounds optical fiber core 617 with one or more strengthening materials 623, such as Kevlar fibers. Strengthening materials 623 may be further contained utilizing one or more outer sheathing materials 625. According to particular implementations, outer sheathing material 625 has a relatively smooth finish to facilitate engagement and disengagement with a connector receiver bore, such as connector receiver bores 267 of docking panels 207 and 257.

According to certain embodiments, retraction portion (i.e., spring) 605 correspondingly couples to housing portion 603, as well as to a portion of a patch cord panel, such as patch cord panel 205 or 255. In this manner, as retraction portion 605 stretches, i.e., when connector portion 601 of patch cord 600 is engaged with a connector receiver bore of, for example, docking panel 207 or 257, retraction portion 605 provides a disengagement force in an opposing direction to the biasing force of internal biasing member 621. It is noted, however, that this disengagement force is not of sufficient magnitude to disengage connector portion 601 from a connector receiver bore. Instead, this disengagement force is provided in order to lessen the burden on a robotic arm, such as robotic arm 203 or 253, when disengaging an optical patch cord connector 219 from a docking panel, such as docking panel 207 or 257.

While connector portion 601 of optical patch cord 600 has been described according to the illustrated embodiment, it is contemplated that connector portion 601 may be replaced with any conventional fiber optic connector, whether of the screw, snap, or bayonet type. Exemplary conventional fiber optic connectors may include so-called D4 connectors, E-2000 connectors, enterprise systems connection (ESCON) connectors, F-3000 connectors, ferrule connection (FC) connectors, local connector (LC) connectors, mechanical transfer registered jack (MT-RJ) connectors, multi-fiber push on (MPO) connectors, standard connector (SC) connectors, straight tip (ST) connectors, sub miniature A (SMA) connectors, sub miniature C (SMC) connectors, etc.

Figure 7:
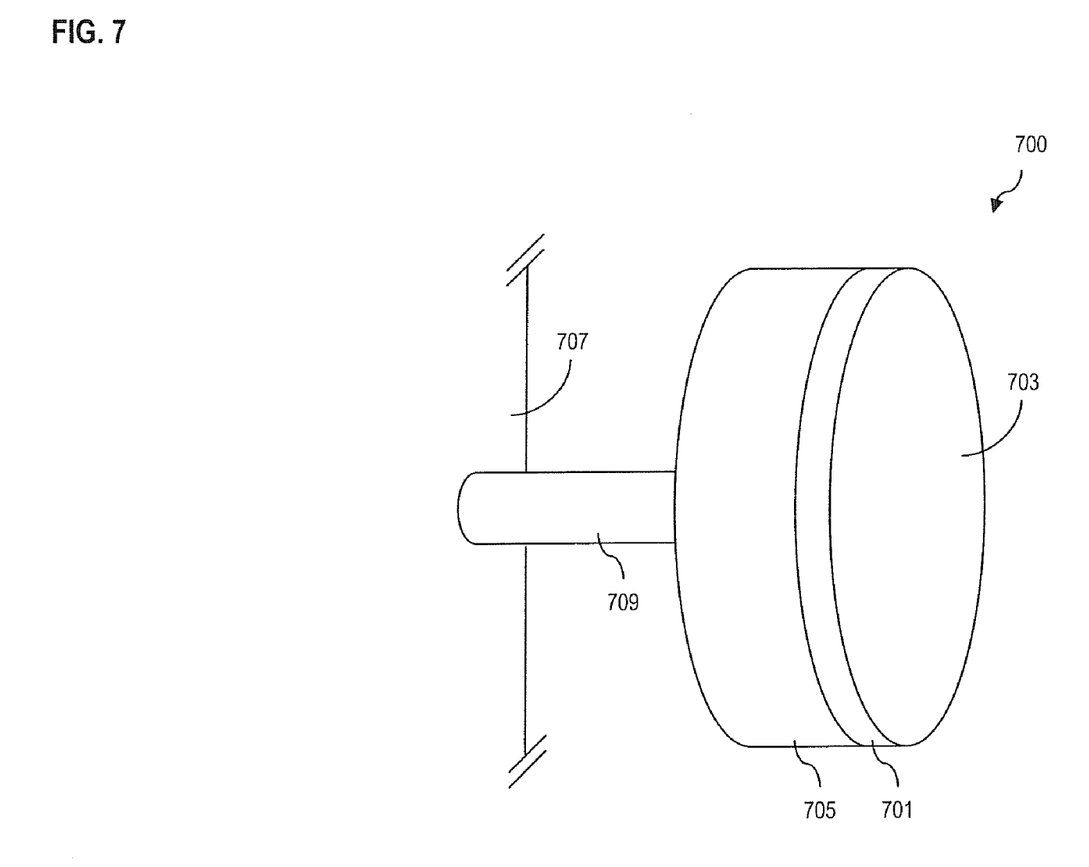
FIG. 7 is a schematic diagram of a cleaning pad, according to an exemplary embodiment.

FIG. 7 is a schematic diagram of a cleaning pad, according to an exemplary embodiment. Cleaning pad 700 includes pad 701 having an abrasive surface 703 for cleaning and/or polishing the tips 219a of optical fiber connectors 219, such as for cleaning and/or polishing tips 219a before automated engagement of an optical patch cord connector 219 or after automated disengagement of an optical patch cord connector 219. While shown as a contiguous entity, pad 701 may include various regions (not shown) exhibiting disparate abrasive features configured to clean and/or polish tips 219a of optical patch cord connectors 219 in various stages. Nevertheless, pad 701 is coupled to and, thereby, supported by support 705. Support 705 is coupled to a termination panel 707, such as docking panel 207 or 257, via support 709. In this manner, support 709 enables pad 703 to be "raised" from a surface of termination panel 709. It is noted that while cleaning pad 700 is generally illustrated as having a cylindrical shape, any other suitable geometry may be utilized.

Figure 8:
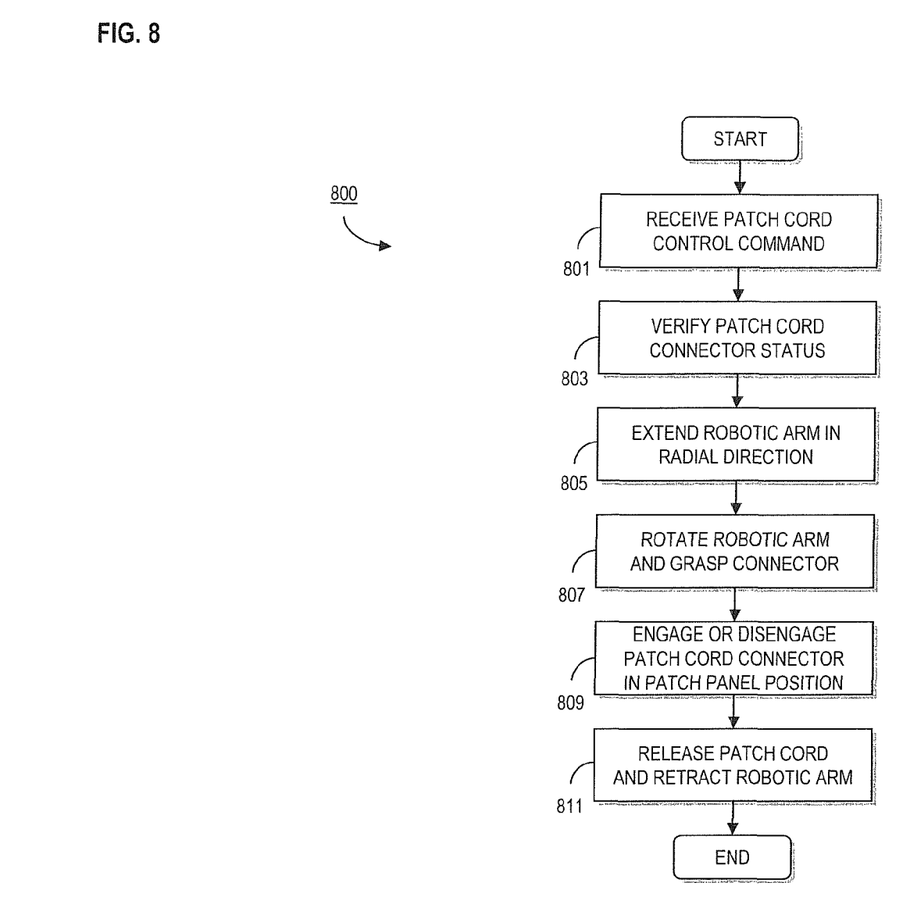
FIGS. 8 and 9 are flowcharts of processes for automated provisioning of patch cables, according to exemplary embodiments.
Figure 9:
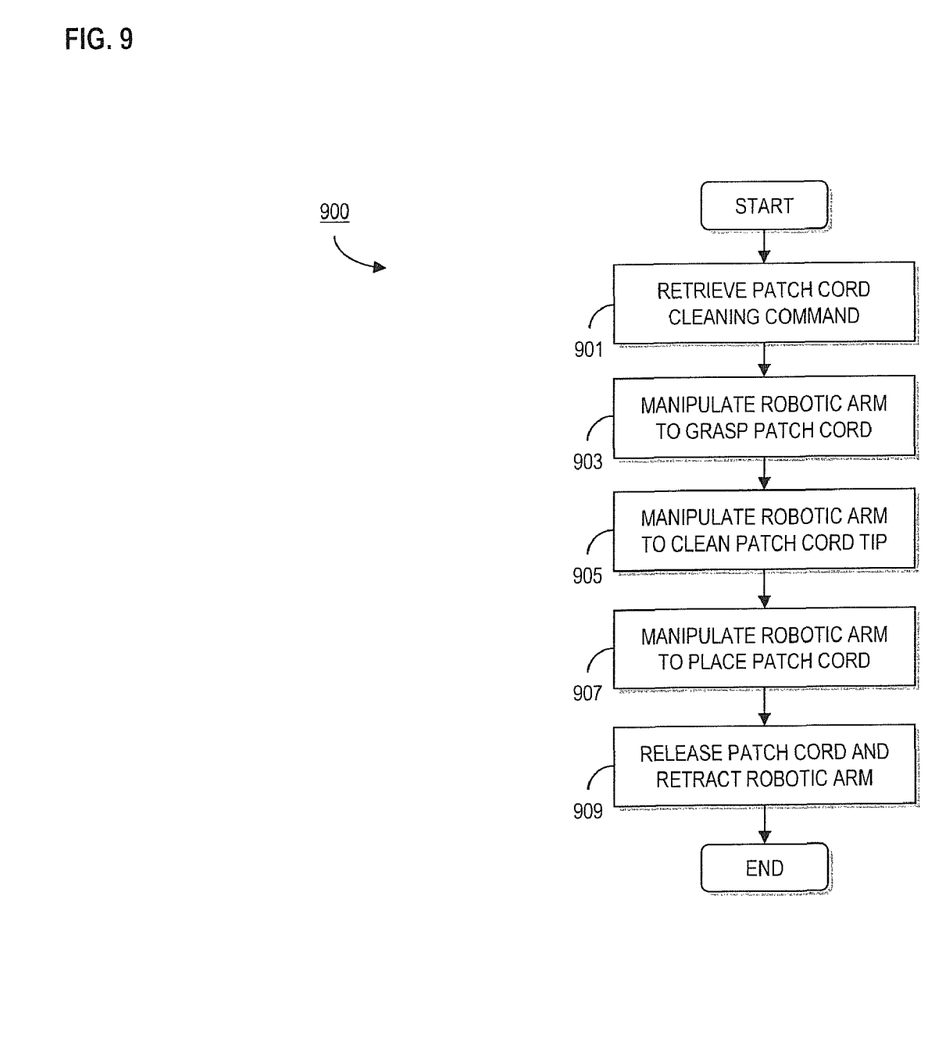

FIGS. 8 and 9 are flowcharts of processes for automated provisioning of patch cables, according to exemplary embodiments. For illustrative purposes, these processes are described with respect to FIGS. 1 and 2. It is noted that the steps of these processes may be performed in any suitable order, as well as combined or separated in any suitable manner.

More specifically, process 800 is an exemplary process for automated engagement or disengagement of an optical patch cord connector. In step 801, controller 115 receives a control command(s) to engage or disengage an optical patch cord connector 219 in (or from) a particular connector receiver bore 267. Such commands may be received and/or acquired from memory 117 and, additionally (or alternatively) over one or more of the aforementioned communication networks. Per step 803, controller 115 verifies a status (e.g., engaged or disengaged) of the patch cord connector 219 associated with the control command(s). Assuming an appropriate status for the relevant patch cord connector 219, controller 115 causes (per step 805) robotic arm 203 to extend in an appropriate radial direction, i.e., towards enclosure 201, via actuator(s) 113. Actuator(s) 113 manipulate one or more of the links and/or joints of robotic arm 203 to achieve the motion, which may include translational displacement and/or rotational movement. In step 807, controller 115 causes, via actuator(s) 113, robotic arm 203 to rotate and grasp a particular patch cord connector 219. Accordingly, controller 115 controls robotic arm 203 via actuator(s) 113 to engage or disengage, as in step 809, the patch cord connector 219 in an appropriate patch panel position, e.g., a particular connector receiver bore 267. Per step 811, controller 115 controls robotic arm 203 via actuator(s) 113 to release the patch cord connector 219 and retract to a resting state.

Process 900 is an exemplary process for automated cleaning and/or polishing of an optical patch cord connector tip. It is noted that the process may be utilized before engagement of an optical patch cord connector in a connector receiver bore or after disengagement of the optical patch cord connector from the connector receiver bore. Accordingly, in step 901, controller 115 receives a control command(s) to clean and/or polish an optical patch cord connector tip 219a. As previously mentioned, such commands may be received and/or acquired from memory 117 and, additionally (or alternatively) over one or more of the aforementioned communication networks. Per step 903, controller 115 manipulates robotic arm 203, via one or more actuator(s) 113, to grasp a particular patch cord 219. It is noted that similar to process 800, robotic arm can be controlled to extend in the radial direction and then in the axial direction to retrieve the appropriate patch cord connector 219. At step 905, controller 115 manipulates robotic arm 203, via one or more actuator(s) 113, to clean and/or polish patch cord connector tip 219a utilizing cleaning pad 223. Once patch cord connector tip 219a is cleaned and/or polished, controller 115 manipulates (per step 907) robotic arm

203, via one or more actuator(s) 113, to place patch cord connector 219 in an appropriate position, whether it be at a resting (or disengaged) state at patch cord panel 205 or at a connected (or engaged) state at docking panel 207. At step 909, controller 115 manipulates robotic arm 203, via one or more actuator(s) 113, to release place patch cord connector 219 and return to a resting state.

Figure 10:
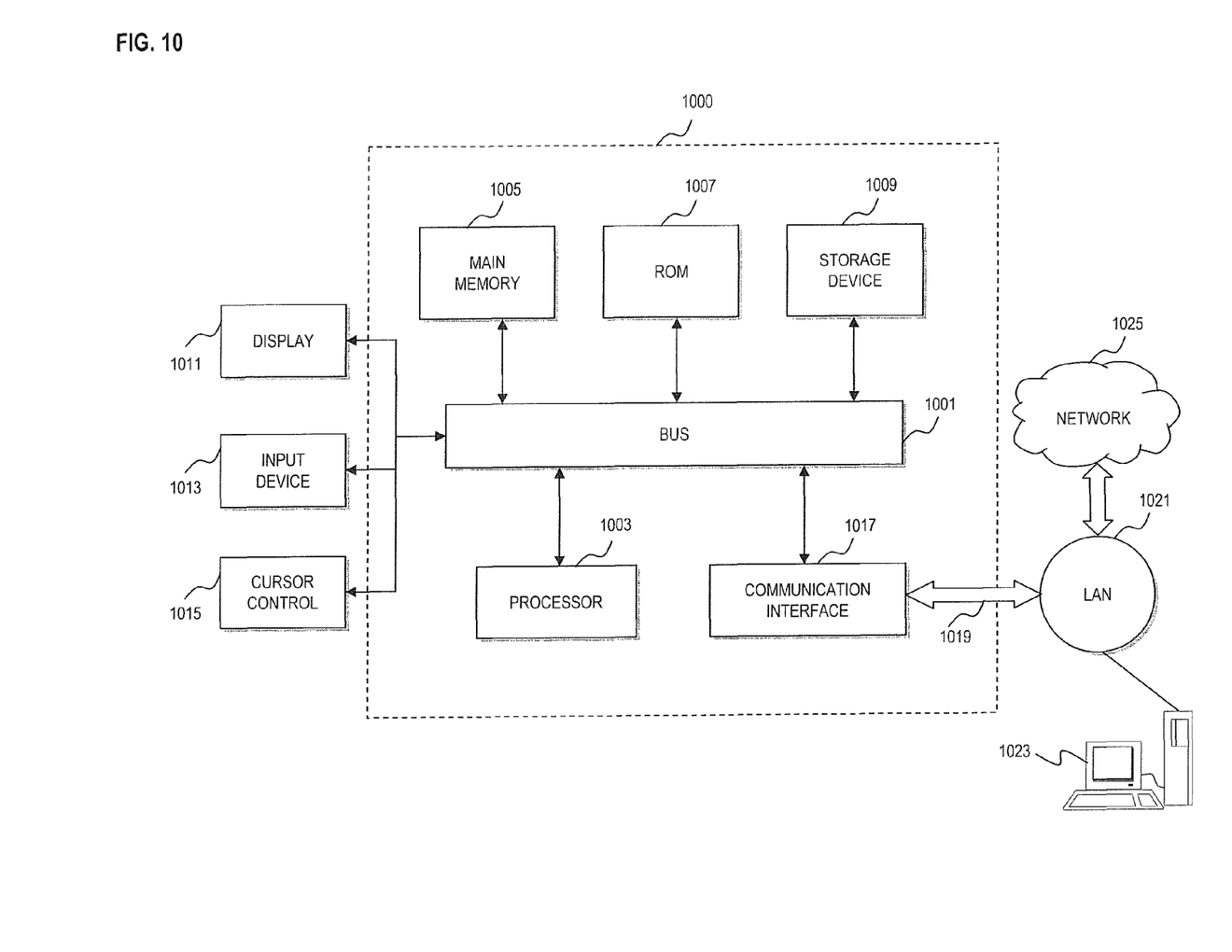
FIG. 10 is a block diagram of a computer system that can be used to implement various exemplary embodiments.

The processes described herein for automated provisioning of patch cables may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below FIG. 10 illustrates computing hardware (e.g., computer system) 1000 upon which an embodiment according to the invention can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. An apparatus comprising:
    a docking panel including a plurality of ports for connecting with a fiber optic patch cord, wherein the ports are disposed about a disk-shaped surface of the docking panel; and
    a robotic mechanism for changing a connection state of the fiber optic patch cord through one or more automated movements,
    wherein the fiber optic patch cord includes a retraction spring coupled to a disk-shaped patch cord panel for supporting a plurality of fiber optic patch cords including the fiber optic patch cord.

2. An apparatus according to claim 1, further comprising:
    a processor for controlling the automated movements of the robotic mechanism, the automated movements relating to translation or rotation within a three-dimensional space of the apparatus.

3. An apparatus according to claim 2, wherein the robotic mechanism includes an end effector for interfacing with a connector of the fiber optic patch cord.

4. An apparatus according to claim 1, wherein the fiber optic patch cord includes a connector having a smooth finish to prevent tangling.

5. An apparatus according to claim 1, wherein the fiber optic patch cord includes a connector having a ferrule and an internal biasing member, the internal biasing member being caused to bias the ferrule against a ferrule of the docking panel when the fiber optic patch cord is connected to a port of the docking panel.

6. An apparatus according to claim 1, wherein the fiber optic patch cord includes a biasing shoulder for aligning and securing the fiber optic patch cord to a port of the docking panel.

7. An apparatus according to claim 1, wherein the panel includes a pad for cleaning or polishing a tip of the fiber optic patch cord.

8. An apparatus according to claim 1, wherein the plurality of ports of the docking panel is monitored by a tracking system, and
    information relating to a connection state of the plurality of ports are stored in a database.

9. An apparatus according to claim 1, wherein the docking panel is supported within a cavity of a cylindrically-shaped enclosure, the cavity being sealed off from an ambient environment.

* * * * *